Oct. 20, 1925.
G. A. SWAZEY
FISHING REEL
Filed Oct. 3, 1923
1,558,310
2 Sheets-Sheet 1
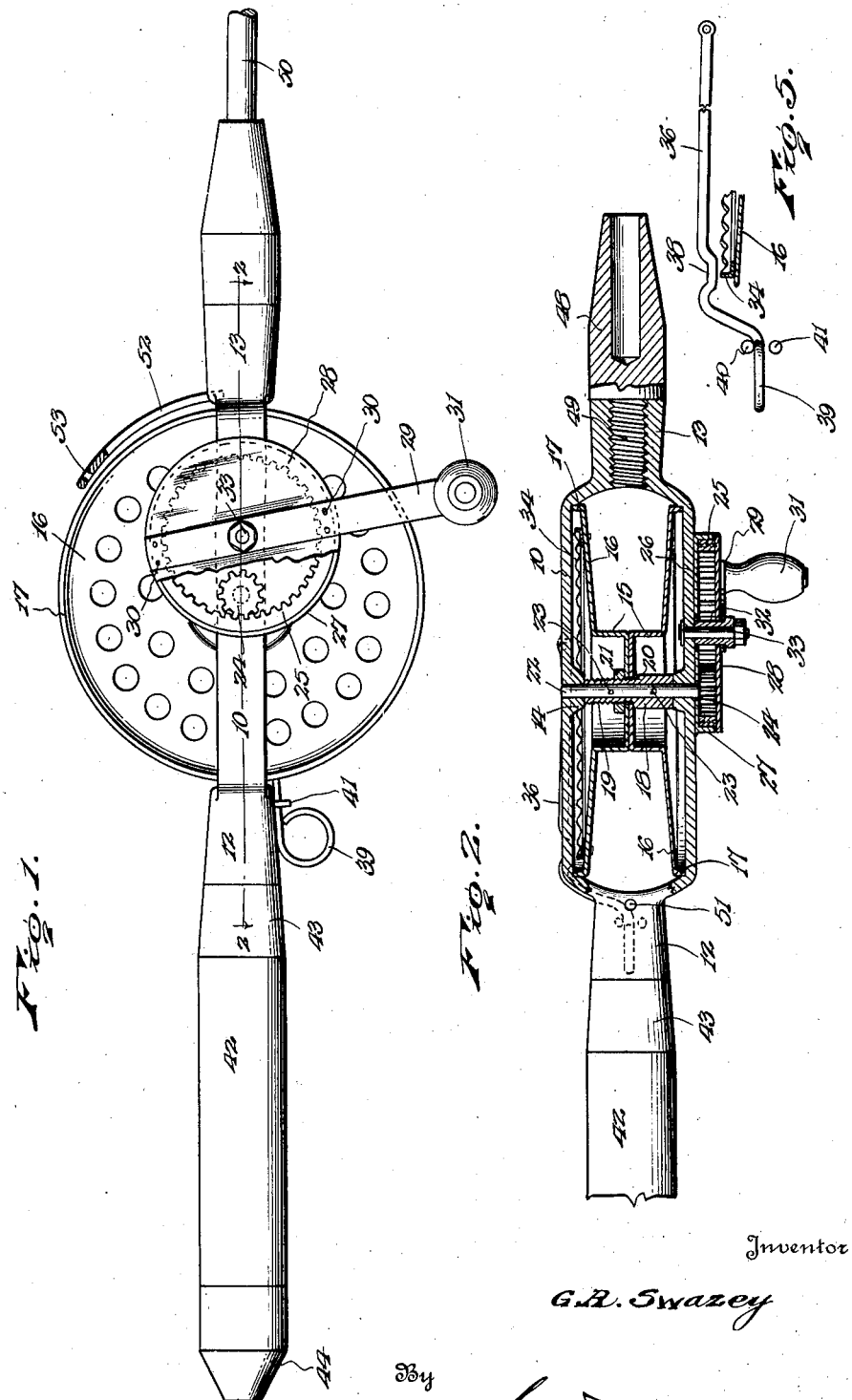
Inventor
G.A. Swazey
By Lacey & Lacey, Attorneys Oct. 20, 1925.
G. A. SWAZEY
1,558,310
FISHING REEL
Filed Oct. 3, 1923
2 Sheets-Sheet 2
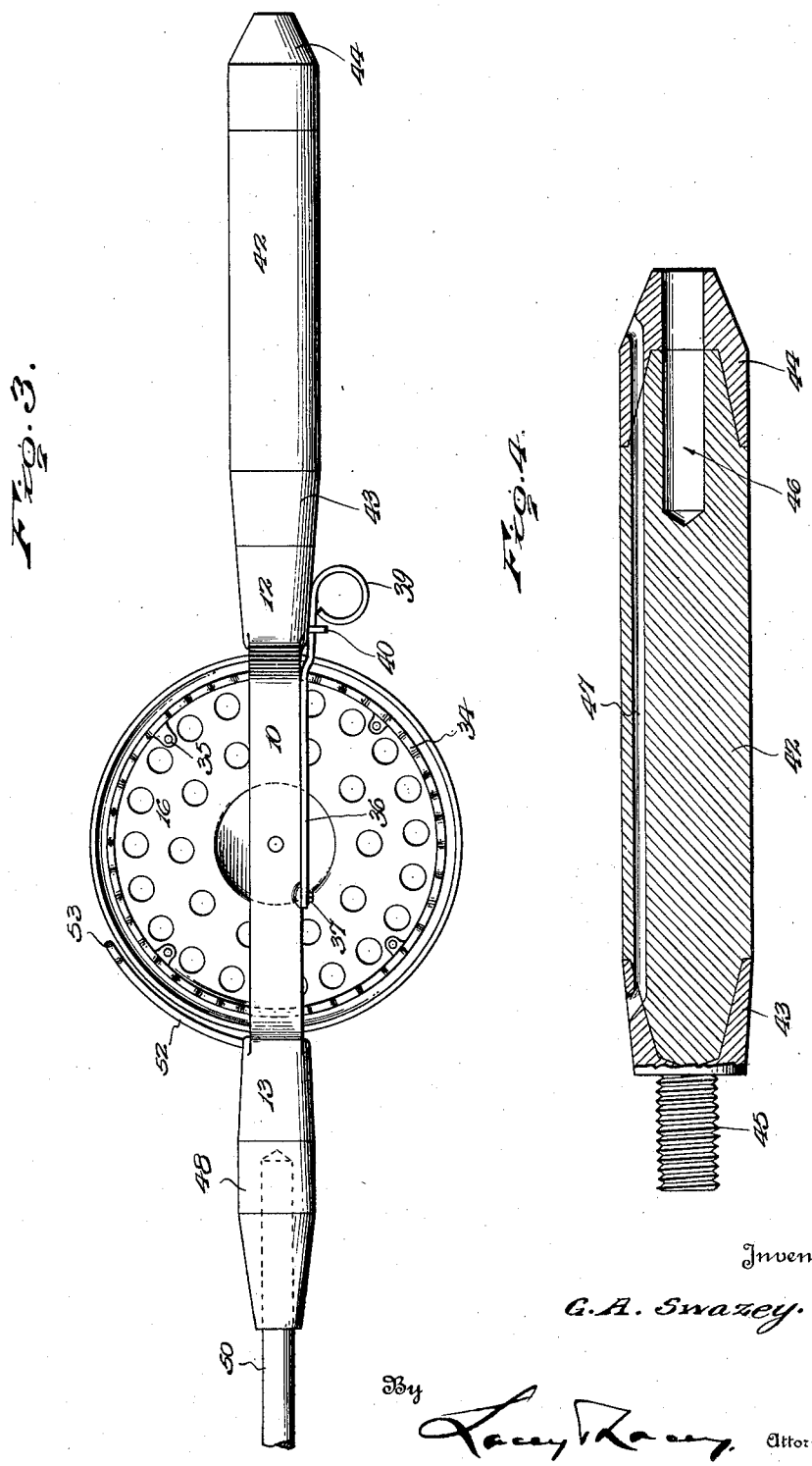

Patented Oct. 20, 1925.

1,558,310

UNITED STATES PATENT OFFICE.

GEORGE A. SWAZEY, OF MILO, MAINE.

FISHING REEL.

Application filed October 3, 1923. Serial No. 666,316.

*To all whom it may concern:*

Be it known that I, GEORGE A. SWAZEY, citizen of the United States, residing at Milo, in the county of Piscataquis and State of Maine, have invented certain new and useful Improvements in Fishing Reels, of which the following is a specification.

This invention relates to a fishing reel and seeks to provide a reel which, in order that the reel may be economically produced and sold, will be characterized by extreme structural simplicity and yet will prove entirely adequate and efficient in practical use.

Other and incidental objects will appear hereinafter.

In the drawings:

Figure 1 is a side elevation of my improved reel, parts being broken away,

Figure 2 is a sectional view on the line 2—2 of Figure 1, looking in the direction of the arrows, Figure 3 is an elevation looking at the side of the reel opposite that shown in Figure 1, Figure 4 is a longitudinal sectional view through the handle employed, and Figure 5 is a fragmentary plan view particularly showing the click of the reel.

In carrying the invention into effect, I employ a frame comprising spaced parallel side members or bars 10 connected at their ends by alined sockets 12 and 13 and formed on the side members medially of the frame are oppositely disposed bearings 14. Journaled between the side members of the frame is a spool which, as shown in detail in Figure 2, is formed of companion sections having abutting cylindrical hub members 15 and circular side plates 16 dished toward the hub members, the side plates being preferably provided with peripheral outwardly turned flanges 17 and being apertured for reducing the weight of the spool as well as facilitating the drying of the line thereon. The sections of the spool are preferably pressed from suitable sheet metal and connecting said sections is a sleeve 18 snugly received between the bearings 14 of the side members 10 of the frame. The sleeve is formed with a reduced portion 19 defining an annular shoulder 20 and, as will be observed, the hub members 15 are provided with axial openings freely receiving the reduced portion of the sleeve so that one of said members abuts said shoulder. Threaded upon the reduced portion 19 of the sleeve is a nut 21 coacting with the other of said hub members for binding the hub members in abutting relation clamped between the nut and said shoulder. Extending through the bearings 14 and through the sleeve 18 is a spindle 22 journaled in said bearings for rotatably supporting the spool and extending through the sleeve and through said spindle are pins 23 locking the spool and spindle to turn in unison, one of said pins being, as shown in Figure 2, preferably arranged to limit the nut 21 against retrograde movement. Fixed upon one end of the spindle 22 is a pinion 24 and meshing with said pinion is an internal gear ring 25. Interposed between said gear ring and the adjacent side member 10 of the frame is a circular housing cup 26 appropriately secured to said side member and having a rim 27 freely surrounding the ring, the cup being apertured to accommodate the spindle 22. Closing said cup is a circular plate 28 overlying the rim 27 of the cup. Extending diametrically across the plate is a crank 29 connected to the gear ring 25 by rivets or other suitable fastening devices 30 extending through the crank, the plate 28, and the gear, locking these parts to turn in unison, and mounted upon the crank at its outer end is an appropriate handle 31. Extending through the crank 29 axially of the gear ring 25 is a hub 32 permanently fixed to the crank so as to turn therewith. This hub is of a length to extend through a suitable opening in the bottom wall of the housing cup 26 to abut the adjacent side member 10 of the frame and extending through said side member and through the hub is a bolt 33 journaling the hub to rotatably support the gear ring 25 as well as detachably connecting said gear ring and associated parts with the frame. Accordingly, as will be seen, the crank 29 may be turned for rotating the spool.

Mounted upon the spool at the side of the reel opposite the crank 29 and associated parts, is a click ring 34 provided at spaced points, as best shown in Figure 3, with lugs 35 riveted or otherwise secured to the adjacent side plate 16 of the spool. At its outer edge, said ring is notched to form teeth and mounted to cooperate with said ring is a pawl 36. This pawl is preferably formed from a piece of suitable resilient wire and is pivoted at its forward end to the adjacent side member 10 of the frame by a screw or other suitable fastening device 37 preferably arranged forwardly of the plane of the spindle 22. The pawl extends rearwardly beneath said side member and, as shown in detail in Figure 5, is bent inwardly, as indicated at 38, to cooperate with the ring 34 while the rear end portion of the pawl is deflected laterally to extend beneath the socket 12 of the frame and terminates in a finger loop 39. Depending from said socket at its lower side to cooperate with the rear end of the pawl are pins 40 and 41 spaced apart to receive the pawl therebetween limiting the pawl against swinging movement. However, when the reel is in use, the little finger of the hand may be engaged through the loop 39 of the pawl when the pawl may be flexed to dispose the rear end thereof at the outer side of the pin 40, blocked by said pin against movement to engage the click ring 34. On the other hand, the pawl may be flexed to dispose the rear end thereof at the outer side of the pin 41, locking the pawl in position having the portion 38 thereof bearing against the click ring when the pawl will, of course, function to resist rotation of the spool. A simple and efficient click is thus provided.

Detachably connected with the frame is a handle 42 equipped at its ends with ferrules 43 and 44. The ferrule 43 is equipped with a stud 45 which is threaded into the socket 12 while at the end thereof opposite the ferrule 43, the handle is formed with a socket 46 opening through the ferrule 44. The socket 46 is, of course, designed to removably receive a rod so that, if desired, the reel may be used at the rear end of the handle and to facilitate such use of the reel, the handle is formed near its periphery, with a longitudinally extending bore or channel 47 opening through the ferrules 43 and 44 so that the line may be arranged to extend through said bore to thus be guided onto the reel from the handle. I further provide a socket 48 which is formed with a stud 49 threaded into the socket 13 of the reel frame. The socket 48 is, as shown in Figure 1, designed to accommodate a rod, as conventionally illustrated at 50. Thus, provision is made whereby the reel may be used in front of the handle 42 and formed in the base ends of the sockets 12 and 13 at the upper sides thereof are openings 51 to selectively receive a line guide 52, one of said openings being shown in Figure 2 of the drawings. The line guide is arranged to curve rearwardly in front of the reel spool and is provided at its free end with an eye 53 to receive the line therethrough. Should the operator prefer to use the line guide in lieu of threading the line through the bore 47 of the handle, when the reel is used at the rear end of the handle, the line guide may be reversed from the socket 13 to the socket 12.

Having thus described the invention, what is claimed as new is:

1. A fishing reel including a frame, a spindle journaled thereon, means for rotating the spindle, a sleeve upon the spindle limiting the spindle against displacement, a sectional spool assembled upon the sleeve, means rotatably adjustable on the sleeve and clamping the spool sections in position, and means locking the sleeve and spindle to turn in unison and disposed to limit said clamping means against retrograde movement.

2. A fishing reel including a frame, a spool rotatably mounted thereon, means for rotating the spool, a click ring carried by the spool, a pawl mounted at one end upon the frame and manually movable at its opposite end to bear at its intermediate portion against said ring for retarding rotation of the spool, and a pin carried by the frame and engageable by the latter end of the pawl for locking the pawl against retrograde movement coacting with said ring.

3. In a fishing reel, the combination of a frame including spaced side bars connected at their ends by sockets one to removably receive a handle and the other to operatively and removably receive a rod, a rotatable spool mounted between the side bars of the frame, said sockets being provided with openings, and a line guide removably engageable in said openings selectively.

4. A fishing reel including a frame, a spool rotatably mounted thereon, means for rotating the spool, a click ring carried by the spool and provided with laterally presented teeth, and a pawl pivoted at one end upon the frame at a point within the lines of said ring and swingingly movable laterally at its opposite end relative to the frame to cooperate at its intermediate portion with the teeth of said ring for retarding rotation of the spool.

In testimony whereof I affix my signature.

GEORGE A. SWAZEY. [L. S.]